3,288,575
WELDED NICKEL STEEL ARTICLE
Mikolaj Cyprian Tomasz Bystram, Turnford, and Michael Frank Stuchfield, Broxbourne, England, assignors to Murex Welding Processes Limited, Waltham Cross, Hertfordshire, England, a British company
No Drawing. Filed Nov. 7, 1963, Ser. No. 322,068
2 Claims. (Cl. 29—196.1)

Recent studies of materials for containers for liquefied gases have proved conclusively the desirability of employing a 9% nickel steel, i.e. a steel meeting the A.S.T.M. specification A-353-58, which in the double normalised tempered or the quenched-tempered condition gives a tensile strength in the range of 45–53 tons/sq. in. combined with an impact resistance of over 25 ft. lbs. V-notch Charpy (10 x 10 mm.) at −196° C.

Furthermore, the favourable combination of the relatively high design strength and satisfactory impact resistance of 9% nickel steel is not significantly impaired by the heat of the welding operations and up to the present time satisfactory weld-joints have been obtained with welding electrodes yielding welds of the 75 nickel-15 chromium-7 iron type containing columbium. These welds combine the high impact resistance of 50–60 ft. lbs. V-notch Charpy (10 x 10 mm.) with a slightly low tensile strength of 42–47 tons/sq. in.

Such electrodes are, however, very expensive owing to the high alloy content of the wire and the high cost of wire processing, and consequently there is a growing need for a more economical electrode with a high tensile strength which would enable the 9% nickel steel with its desirable high design strength to be exploited to the fullest extent.

A more economical electrode can be produced using a lower nickel content and a higher iron content in the weld metal but although it yields a weld having an excellent impact resistance of 50–70 ft. lbs. V-notch Charpy (10 x 10 mm.) at −196° C. it suffers from a reduction in the ultimate tensile strength.

With the object of improving the tensile strength of nickel-chromium-iron weld metals generally and the higher iron-content weld metals in particular, the invention provides for the addition to the weld metal of 4–8% molybdenum and ½–3% tungsten in the presence of ½–3% columbium.

It has been found that the addition of molybdenum and tungsten in the proportions stated provides an increase in the tensile strength of the weld metal of 4–7 tons/sq. in.

It is desirable for reasons of economy in materials and in the processing of wire to develop a nickel-chromium-iron type of weld metal containing more than 10% iron and in a preferred embodiment of the invention the weld metal includes not less than 15% iron. More specifically, it is found to be economical to modify the weld metal of the 60 nickel-15 chromium-20 iron type which has hitherto been found to have excellent impact resistance of 50–70 ft. lbs. V-notch Charpy (10 x 10 mm.) at −196° C. but a relatively low ultimate tensile strength in the range of 39–43 tons/sq. in. The addition of molybdenum and tungsten to a weld metal of this type in the proportions stated provides a substantial increase in the tensile strength without any marked reduction in the impact resistance.

For some purposes it may be desirable also to incorporate in the weld metal small quantities of manganese, vanadium and cobalt, especially in cases where a higher iron-content weld metal is required. The invention accordingly provides a flux-coated manual arc welding electrode which deposits nickel-chromium-iron weld metal of the following composition, all percentages being percentages by weight:

Carbon—from 0.05% to 0.40%
Nickel—from 35% to 65%
Chromium—from 10% to 25%
Molybdenum—from 4% to 8%
Tungsten—from 0.5% to 3.0%
Columbium—from 0.5% to 3.0%
Manganese—from 0 to 8%
Cobalt—from 0 to 3%
Vanadium—from 0 to 3%
Silicon—from 0 to 1.0%
Iron—from 10% to 45%

Preferably the deposited weld metal has the following composition:

Carbon—from 0.1% to 0.2%
Nickel—from 55% to 60%
Chromium—from 12% to 17%
Molybdenum—from 5% to 7%
Tungsten—from 1% to 3%
Columbium—from 1% to 1.5%
Silicon—from 0.2% to 0.7%
Manganese—from 1% to 3%

It is found that the increase in the tensile strength of the weld metal as a result of alloying with molybdenum and tungsten does not seriously affect the ductility or the impact strength of the deposited weld metal, which has in fact been found to have an improved resistance to hot-cracking and a higher creep strength at temperatures above 800° C., thus extending the usefulness of such weld metals at both extremes of the temperature scale. In addition, the deposited weld metal has a limited degree of self-restraint due to shrinkage during solidification.

The following is a table comparing the tensile strength, percentage elongation and impact resistance of two weld metals hitherto employed, and a third weld metal according to the present invention:

| Weld Metal | U.T.S. at 20° C. tons per square inch | Percent elongation: (a) 2″ gauge length; (b) ½″ gauge length | Charpy V-notch at −196° C., ft.-lbs. (10 x 10 mm.) |
|---|---|---|---|
| 75% nickel, 15% chromium, 7% iron plus columbium. | 42–47 | (a) 5–10 (b) 30–35 | 50–60 |
| 60% nickel, 15% chromium, 20% iron plus columbium. | 39–43 | (a) 5–10 (b) 30–35 | 50–70 |
| 55% nickel, 15% chromium, 20% iron plus 5% molybdenum plus 1% tungsten plus columbium. | 45–49 | (a) 5–10 (b) 25–30 | 30–60 |

It will be appreciated that the flux coating of electrodes according to the present invention may be suitable for downhand and positional welding and that a part or all of the alloying materials such as molybdenum, tungsten, columbium, vanadium, cobalt and manganese may advantageously be incorporated in the coating.

While the electrodes according to the invention are of particular utility for welding 9% nickel steel they are also useful for welding low alloy creep resisting steels having a co-efficient of expansion between 0° and 500° C. not exceeding $15.10^{-6}$ per degree centigrade such as the 1% chromium ½% molybdenum, 2.25% chromium, 1% molybdenum, 5% chromium, ½% molybdenum and similar grades suitable for service up to 600° C. and high alloy creep resisting steels including steels containing over 50% nickel.

Having regard to the fact that there is some loss in chromium manganese, silicon, columbium and carbon, as the result of oxidation and/or volatilisation, on passage from the electrode to the weld metal, the electrode will contain a somewhat larger proportion of these elements than that required in the weld metal.

The following are examples of two typical electrodes for use in accordance with the invention. In each case the electrode has a core wire of a nickel-chromium alloy containing 60% Ni, 20% Cr, the balance iron and the flux compositions are quoted below:

*Example 1*

| | Percent |
|---|---|
| Carbonates: | |
| $CaCo_3$, $MgCO_3$ | 15–50 |
| Fluorides: | |
| $CaF_2$, $Na_3AlF_6$, NaF, $AlF_3$ | 2–50 |
| Metal Oxides: | |
| $SiO_2$, $TiO_2$, $Al_2O_3$, $Mn_3O_4$ | 0–30 |
| Metal alloy powders containing: | |
| Fe | 0–30 |
| Mo | 10–25 |
| Cb | 8–20 |
| W | 8–20 |
| V | 0–15 |
| Co | 0–25 |
| Deoxidisers and desulphurisers containing: | |
| Fe, Al, Ti, Mg, Nn in various combinations | 2–15 |
| Extrusion Aids | 0–5 |

*Example 2*

| | Percent |
|---|---|
| $CaCo_3$ | 25 |
| $CaF_2$ | 20 |
| $Na_3AlF_6$ | 5 |
| $SiO_2$ | 3 |
| Fe-Mo | 25 |
| FeCb | 10 |
| W | 5 |
| FeMn | 3 |
| Al-Ti | 2 |
| Extrusion Aid | 2 |
| | 100 |

In Example 1 the metals may be present as pure metals, as ferroalloys or as alloys with one another.

What we claim as our invention and desire to secure by Letters Patent is:

1. An article useful at the temperature of liquefied gas comprising at least two members of 9% nickel steel joined at a weld seam by weld metal deposited by welding, said weld metal having, when cooled to −190° C., a tensile strength in the range of 45–53 tons/sq. in. and an impact resistance of over 25 ft. lbs. V-notch Charpy (10 x 10 mm.), said weld metal being of the following composition by weight:

Carbon—from 0.05% to 0.40%
Nickel—from 35% to 65%
Chromium—from 10% to 25%
Molybdenum—from 4% to 8%
Tungsten—from 0.5% to 3.0%
Columbium—from 0.5% to 3.0%
Manganese—from 0 to 8%
Cobalt—from 0 to 3%
Vanadium—from 0 to 3%
Silicon—from 0 to 1.0%
Iron—from 10% to 45%

2. An article useful at the temperature of liquefied gas comprising at least two members of 9% nickel steel joined at a weld seam by weld metal deposited by welding, said weld metal having, when cooled to −190° C., a tensile strength in the range of 45–53 tons/sq. in. and an impact resistance of over 25 ft. lbs. V-notch Charpy (10 x 10 mm.), said weld metal being of the following composition by weight:

Carbon—from 0.1% to 0.2%
Nickel—from 55% to 60%
Chromium—from 12% to 17%
Molybdenum—from 5% to 7%
Tungsten—from 1% to 3%
Columbium—from 1% to 1.5%
Silicon—from 0.2% to 0.7%
Manganese—from 1% to 3%

References Cited by the Examiner

UNITED STATES PATENTS 3,184,577   5/1965   Witherell _____ 219—146

HYLAND BIZOT, *Primary Examiner.*

JOSEPH V. TRUHE, *Examiner.*